(12) United States Patent
You et al.

(10) Patent No.: US 12,402,225 B2
(45) Date of Patent: Aug. 26, 2025

(54) LIGHT-EMITTING DEVICE CONTROL METHOD AND DEVICE

(71) Applicant: Shenzhen Intellirocks Tech. Co., Ltd., Shenzhen (CN)

(72) Inventors: Jie You, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 31 days.

(21) Appl. No.: 18/559,314

(22) PCT Filed: Aug. 20, 2021

(86) PCT No.: PCT/CN2021/113846
§ 371 (c)(1),
(2) Date: Nov. 6, 2023

(87) PCT Pub. No.: WO2023/015599
PCT Pub. Date: Feb. 16, 2023

(65) Prior Publication Data
US 2024/0237174 A1    Jul. 11, 2024

(30) Foreign Application Priority Data
Aug. 11, 2021  (CN) .......................... 202110921071.5

(51) Int. Cl.
*H05B 47/105* (2020.01)
*G06T 7/73* (2017.01)
(Continued)

(52) U.S. Cl.
CPC ............. *H05B 47/105* (2020.01); *G06T 7/74* (2017.01); *G06V 10/56* (2022.01); *G06V 20/46* (2022.01);
(Continued)

(58) Field of Classification Search
CPC .... H05B 47/105; H05B 47/19; H05B 47/198; G06T 7/74; G06T 2207/10016;
(Continued)

(56) References Cited

U.S. PATENT DOCUMENTS 10,251,245 B2 *  4/2019  Roberts ..................... H02J 7/35
10,264,657 B2 *  4/2019  Liszt ..................... F21V 17/002
(Continued)

FOREIGN PATENT DOCUMENTS

JP       7219915 B2 *  2/2023
KR    102325323 B1 * 11/2021
(Continued)

*Primary Examiner* — Adam D Houston
(74) *Attorney, Agent, or Firm* — Wenye Tan

(57) ABSTRACT

A method for controlling light-emitting devices includes: receiving broadcast signals broadcasted by light-emitting devices; obtaining a lighting video collected during lighting state switching of a light-emitting device; performing lighting state identification based on the lighting video, and determining a second lighting switching instruction message for switching the lighting state of each light-emitting device in the lighting video; matching the first lighting switching instruction message indicated by the broadcast signal with the second lighting switching instruction message corresponding to each light-emitting device in the lighting video to determine a broadcast signal corresponding to each light-emitting device in the lighting video; determining a network address of each light-emitting device in the lighting video based on the determined broadcast signal corresponding to each light-emitting device in the lighting video; and according to the network address of each light-emitting device in the lighting video, controlling a corresponding light-emitting device.

18 Claims, 7 Drawing Sheets

(51) Int. Cl.
  *G06V 10/56* (2022.01)
  *G06V 20/40* (2022.01)
  *G06V 20/80* (2022.01)
  *G06V 30/19* (2022.01)
  *H05B 47/175* (2020.01)
  *H05B 47/19* (2020.01)

(52) U.S. Cl.
  CPC ........ *G06V 20/80* (2022.01); *G06V 30/19007* (2022.01); *H05B 47/19* (2020.01); *H05B 47/198* (2024.01); *G06T 2207/10016* (2013.01); *G06T 2207/10024* (2013.01)

(58) Field of Classification Search
  CPC .... G06T 2207/10024; G06V 30/19007; G06V 10/56; G06V 20/46; G06V 20/80
  See application file for complete search history.

(56) References Cited

U.S. PATENT DOCUMENTS

| | | | |
|---|---|---|---|
| 10,739,978 B2 * | 8/2020 | Nakamura | G06F 3/0485 |
| 11,419,201 B2 * | 8/2022 | Bessems | H05B 47/155 |
| 11,606,222 B2 * | 3/2023 | Jessen | H05B 47/1965 |
| 12,219,631 B2 * | 2/2025 | Foster | G06F 3/016 |
| 2015/0372754 A1 * | 12/2015 | Choi | H04L 63/1466 |
| | | | 398/130 |
| 2017/0013697 A1 * | 1/2017 | Engelen | H05B 47/1965 |
| 2018/0295699 A1 * | 10/2018 | Franciosa | H05B 45/20 |
| 2021/0400788 A1 * | 12/2021 | Mekenkamp | H05B 47/175 |

FOREIGN PATENT DOCUMENTS

| | | | | |
|---|---|---|---|---|
| WO | WO-2020069985 A1 * | 4/2020 | | H05B 45/20 |
| WO | WO-2022024053 A1 * | 2/2022 | | G06T 7/55 |

* cited by examiner

LIGHT-EMITTING DEVICE CONTROL METHOD AND DEVICE

CROSS-REFERENCE TO RELATED APPLICATIONS

This application is a national stage entry of PCT Patent Application No. PCT/CN2021/113846, filed on Aug. 20, 2021, which claims the priority of Chinese Patent Application No. CN2021109210715, filed on Aug. 11, 2021, and entitled "LIGHT-EMITTING DEVICE CONTROL METHOD AND DEVICE," the entire content of all of which is incorporated herein by reference.

FIELD OF THE DISCLOSURE

The present disclosure generally relates to the field of smart home technologies and, more particularly, relates to a light-emitting device control method and related device.

BACKGROUND

In related technologies, smart terminals (such as smartphones) can control light-emitting devices. However, when the smart terminal is connected to multiple light-emitting devices at the same time, the user cannot accurately identify which light-emitting device corresponds to a certain identifier in the device list. In this case, when the user needs to control a certain light-emitting device, the user can only try one by one to find out the identifier in the device list corresponding to the certain light-emitting device. This approach has many steps and is cumbersome. Especially when there are a large number of light-emitting devices, the device control efficiency is low and the user experience is poor.

SUMMARY OF THE DISCLOSURE

In view of the above problems, embodiments of the present disclosure propose a light-emitting device control method and a related device to solve the problem of low control efficiency of the light-emitting device in the related art.

According to an aspect of the embodiments of the present disclosure, a method for controlling light-emitting devices is provided, which is applied to a terminal device. The method includes: receiving broadcast signals broadcasted by at least one light-emitting device, wherein a broadcast signal is used to indicate a first lighting switching instruction message based on which the light-emitting device switches a lighting state; the first lighting switching instruction message is determined based on a device identifier of the light-emitting device; the light-emitting device is equipped with a network module; and the light-emitting device broadcasts the broadcast signal through the network module; obtaining a lighting video collected during lighting state switching of the light-emitting device according to the first lighting switching instruction message; performing lighting state identification based on the lighting video, and determining a second lighting switching instruction message for switching the lighting state of each light-emitting device in the lighting video; matching the first lighting switching instruction message indicated by the broadcast signal with the second lighting switching instruction message corresponding to each light-emitting device in the lighting video to determine a broadcast signal corresponding to each light-emitting device in the lighting video; determining a network address of each light-emitting device in the lighting video based on the determined broadcast signal corresponding to each light-emitting device in the lighting video; and according to the network address of each light-emitting device in the lighting video, controlling a corresponding light-emitting device.

According to an aspect of the embodiments of the present disclosure, a light-emitting device is provided. The light-emitting device is provided with a network module. The light-emitting device broadcasts a broadcast signal through the network module, so that the terminal device that receives the broadcast signal controls the light-emitting device using the above method.

According to an aspect of the embodiments of the present disclosure, a device for controlling light-emitting devices is provided, which is applied to a terminal device. The device includes: a receiving module, configured to receive broadcast signals broadcasted by at least one light-emitting device, wherein a broadcast signal is used to indicate a first lighting switching instruction message based on which the light-emitting device switches a lighting state; the first lighting switching instruction message is determined based on a device identifier of the light-emitting device; the light-emitting device is equipped with a network module; and the light-emitting device broadcasts the broadcast signal through the network module; an acquisition module, configured to obtain a lighting video collected during lighting state switching of the light-emitting device according to the first lighting switching instruction message; an identification module, configured to perform lighting state identification based on the lighting video, and determine a second lighting switching instruction message for switching the lighting state of each light-emitting device in the lighting video; a matching module, configured to match the first lighting switching instruction message indicated by the broadcast signal with the second lighting switching instruction message corresponding to each light-emitting device in the lighting video to determine a broadcast signal corresponding to each light-emitting device in the lighting video; a network address determination module, configured to determine a network address of each light-emitting device in the lighting video based on the determined broadcast signal corresponding to each light-emitting device in the lighting video; and a control module, configured to, according to the network address of each light-emitting device in the lighting video, control a corresponding light-emitting device.

According to an aspect of the embodiments of the present disclosure, an electronic device is provided, including: a processor; and a memory. The memory stores computer-readable instructions for, when the computer-readable instructions are executed by the processor, implementing the above method for controlling light-emitting devices.

According to an aspect of the embodiments of the present disclosure, a computer-readable storage medium is provided. The storage medium stores computer-readable instructions for, when the computer-readable instructions are executed by a processor, implementing the above method for controlling light-emitting devices.

In the solutions of this disclosure, after receiving the broadcast signal broadcasted by the light-emitting device and performing lighting state identification based on the lighting video of the lighting devices, the second lighting switching instruction message for switching the lighting state of each light-emitting device in the lighting video is determined. The first lighting switching instruction message indicated by the broadcast signal broadcasted by the lighting device is matched with the second lighting switching instruction message of the lighting device in the lighting video, thereby corresponding the lighting device in the lighting video with the light-emitting device from which the received broadcast signal comes, and then determining the broadcast signal from each light-emitting device in the lighting video, and correspondingly determining the network address of each light-emitting device in the lighting video, based on the determined network address of each light-emitting device in the lighting video, controlling the light-emitting devices in the lighting video. It can be seen that, in this solution, the user does not need to test each light-emitting device one by one, and the network address of the light-emitting device can be automatically obtained without the user controlling the light-emitting device. Compared with the existing technology, the number of manual operations is reduced, and the operation is simple, improving the control efficiency of light-emitting devices.

Moreover, since the lighting video indicates the location of the light-emitting devices in the actual physical environment, based on the obtained lighting video and the determined network address of each light-emitting device in the lighting video, it is convenient for the user to visually control the light-emitting devices, that is, based on the lighting video, the user can determine the position of the controlled lighting device in the actual physical environment, improving the user experience.

BRIEF DESCRIPTION OF THE DRAWINGS

The accompanying drawings, which are incorporated in and constitute a part of this specification, illustrate embodiments consistent with the present disclosure and, together with the detailed description, serve to explain the principles of the present disclosure. Obviously, the drawings in the following description are only some embodiments of the present disclosure. For those of ordinary skill in the art, other drawings can be obtained based on these drawings without creative efforts.

DETAILED DESCRIPTION

Figure 1:
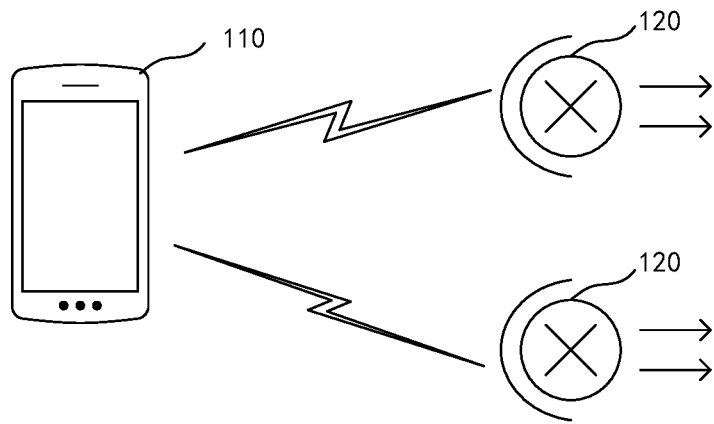
FIG. 1 is a schematic diagram of an application scenario according to an embodiment of the present disclosure.

Exemplary embodiments will now be described more fully with reference to the accompanying drawings. Exemplary embodiments may, however, be embodied in various forms and should not be construed as limiting to the examples set forth herein. Rather, these embodiments are provided so that this disclosure will be more thorough and complete, and convey the concepts of the example embodiments to those skilled in the art.

Furthermore, the described features, structures, or characteristics may be combined in any suitable manner in one or more embodiments. In the following description, numerous specific details are described to provide a more thorough understanding of embodiments of the present disclosure. However, those skilled in the art will appreciate that the technical solutions of the present disclosure may be practiced without one or more of the specific details, or other methods, components, devices, steps, etc. In other instances, well-known methods, apparatus, implementations, or operations are not shown or described in detail to avoid obscuring aspects of the present disclosure.

The block diagrams shown in the drawings may be functional entities and do not necessarily correspond to physically separate entities. That is, these functional entities may be implemented in software form, or implemented in one or more hardware modules or integrated circuits, or implemented in different networks and/or processor devices and/or microcontroller devices.

The flowcharts shown in the drawings are only illustrative, and do not necessarily include all contents and operations/steps, nor must they be performed in the order described. For example, some operations/steps can be decomposed, and some operations/steps can be merged or partially merged, so the actual order of execution may change according to the actual scenarios.

It should be noted that the word "multiple" mentioned in this article refers to two or more. The word "and/or" describes the relationship between related objects, indicating that there can be three relationships. For example, A and/or B can mean: A exists alone, A and B exist simultaneously, and B exists alone. The character "/" generally indicates that the related objects are in an "or" relationship.

The implementation details of the technical solutions of the embodiments of this disclosure are described below.

FIG. 1 is a schematic diagram of an application scenario according to an embodiment of the present disclosure. As shown in FIG. 1, the application scenario may include at least one terminal device 110 and at least one light-emitting device 120 (two light-emitting devices are exemplarily shown in FIG. 1).

The terminal device 110 may be a smartphone, a tablet computer, a notebook computer, a desktop computer, a wearable device, etc., and is not specifically limited here. The light-emitting device 120 may include a variety of lamps, such as ambient lighting lamps, incandescent lamps, tungsten halogen lamps, fluorescent lamps, and high-pressure mercury lamps, or devices that integrate light-emitting and lighting functions, such as smartphones equipped with flash lamps.

In the solutions of this disclosure, the light-emitting device 120 is provided with a network module, so that the light-emitting device 120 can broadcast signals through the network module and establish a communication connection with the terminal device 110 through the network module. Further, the network module can be a Bluetooth module, a WiFi module, a Zigbee module, etc., which is not limited here. Correspondingly, the terminal device 110 is also provided with a corresponding network module. Therefore, based on the network module in the terminal device 110 and the network module in the light-emitting device 120, the terminal device 110 can establish a communication connection with the light-emitting device 120.

After the light-emitting devices 120 establish communication connection with the terminal device 110, the terminal device 110 can control the light-emitting device 120 according to the network address of each light-emitting device 120. For example, the user can control the terminal device 110 and sends a control instruction according to the network address of the light-emitting device 120, so that the light-emitting device 120 may switch the lighting state according to the control instruction.

The lighting state of the light-emitting device 120 may include a light-on state (i.e., a lit state) and a light-off state (i.e., a turned-off state). Furthermore, if the luminous color of the light-emitting device 120 can be adjusted, the lighting state may further include a light-on state corresponding to each light color. For example, if the light-emitting colors of the light-emitting device 120 include red, green, yellow, and purple, the light-on state may include a red light-on state, a green light-on state, a yellow light-on state, and a purple light-on state. Of course, different light-emitting devices 120 may emit different colors, which can be set according to actual needs.

Furthermore, if the brightness of the light-emitting device 120 can be adjusted, the lighting state may further include a light-on state corresponding to each brightness level. For example, if the brightness level of the light-emitting device 120 includes three brightness levels: level I, level II, and level III, then the lighting state may include a light-on state with brightness level I, a light-on state with brightness level II, and a light-on state with brightness level III. Of course, the number of brightness levels of the light-emitting device 120 can be set according to actual needs. The brightness levels listed above are only illustrative and cannot be considered to limit the scope of the present disclosure.

It can be understood that if the light-emitting color and brightness level of the light-emitting device 120 can be adjusted, the light-on state further includes a light-on state for a combination of each light-emitting color and each brightness level.

In some embodiments of the present disclosure, the terminal device 110 is also provided with a video capture device, such as a camera, so that the terminal device 110 can capture a lighting video of the light-emitting device 120 switching between lighting states. In some implementations of the present disclosure, the lighting video can also be collected with the help of an external video collection device, and then the lighting video is sent to the terminal device 110. Based on the lighting video and at least one broadcast signal received from the light-emitting device 120, the terminal device 110 can control the light-emitting device 120 according to the methods provided in this disclosure.

Figure 2:
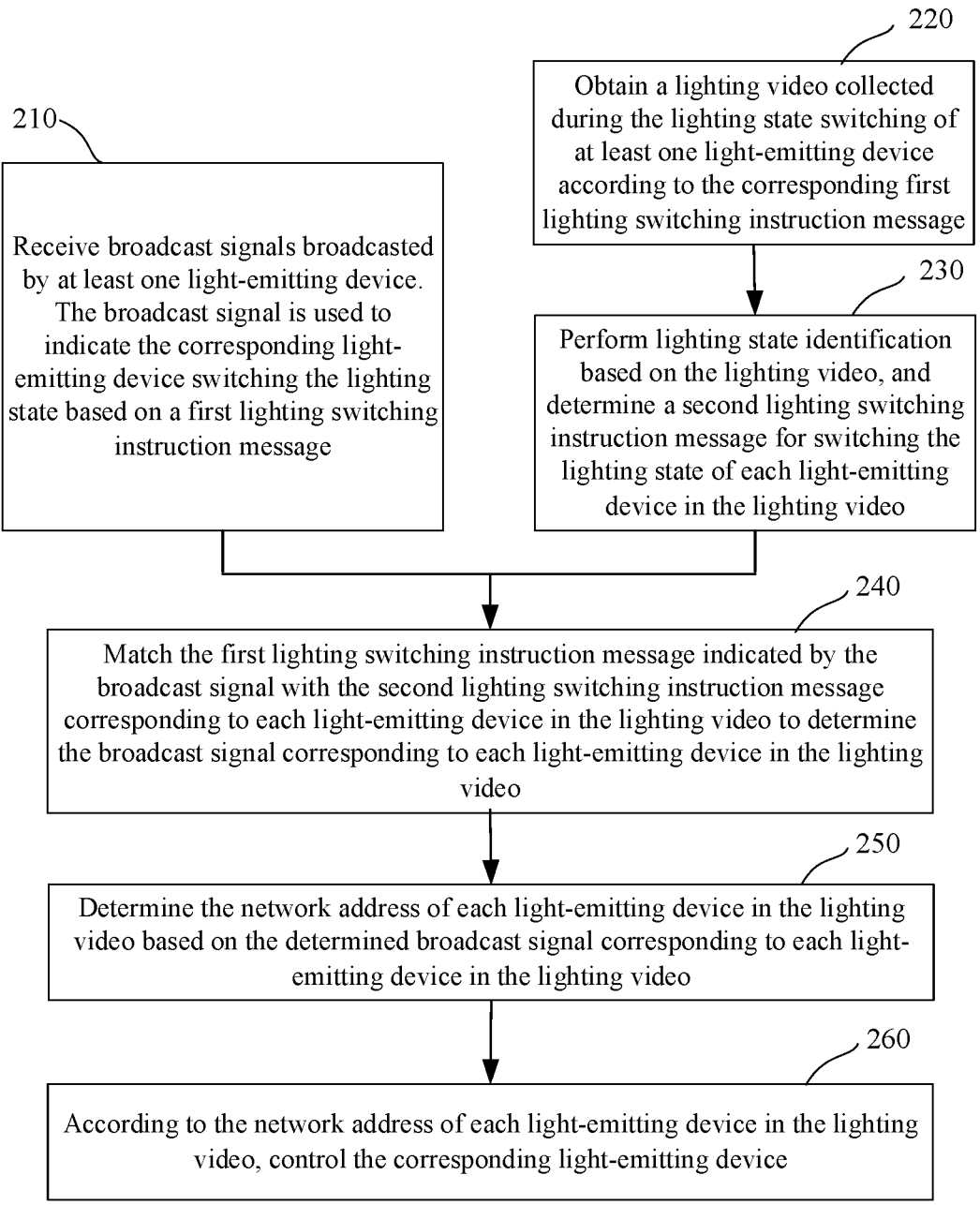
FIG. 2 is a flowchart of a method for controlling light-emitting device according to an embodiment of the present disclosure.

FIG. 2 is a flowchart of a light-emitting device control method according to an embodiment of the present disclosure. The method can be executed by a terminal device with processing capabilities. Referring to FIG. 2, the method includes at least Steps 210 to 240, which are described in detail as follows.

Step 210: Receive broadcast signals broadcasted by at least one light-emitting device. The broadcast signal is used to indicate a first lighting switching instruction message based on which the corresponding light-emitting device switching the lighting state; and the first lighting switching instruction message is determined based on the device identifier of the light-emitting device. The light-emitting device is equipped with a network module, and the light-emitting device broadcasts the broadcast signal through the network module.

As described above, the network module can be a Bluetooth module, a WiFi module, a Zigbee module, etc., which is not limited here. Correspondingly, the terminal device is provided with a network module that has the same communication protocol as that of the light-emitting device, so that the terminal device can receive the broadcast signal broadcasted by the light-emitting device through its own network module. In some embodiments of the present disclosure, the broadcast signal may be in the form of a Bluetooth Low Energy (BLE) broadcast data packet. Bluetooth BLE broadcast is based on the GAP (Generic Access Profile) protocol for data broadcast. GAP defines how devices discover each other, establish connections, and implement binding. It also describes how devices become broadcasters and observers and implement connection-free transmission. At the same time, GAP defines how to use different types of addresses to achieve privacy and accessibility.

The device identifier of the light-emitting device is used to uniquely identify the light-emitting device, which can be the device serial number of the light-emitting device, or the network address of the network module in the light-emitting device, etc. Because the first lighting switching instruction message corresponding to the light-emitting device is generated based on the device identifier of the light-emitting device, it can be ensured that the first lighting switching instruction message corresponding to a different light-emitting device is also different.

The network address of the light-emitting device can be a MAC address (Media Access Control Address). Further, the MAC address can be burned into the EPROM during production by the network equipment manufacturer. The MAC address can be expressed in binary. The MAC address is 48 bits, i.e., the length of the MAC address is 48 bits. It is usually expressed as 12 hexadecimal numbers.

In some embodiments of the present disclosure, the mapping relationship between the hexadecimal number and the lighting state can be preset, where a hexadecimal number uniquely corresponds to a lighting state. Then, based on the mapping relationship between hexadecimal numbers and lighting states, a lighting state sequence formed by combining the lighting states corresponding to the 12 hexadecimal numbers in the MAC address can be used as the first lighting switching instruction message. For example, the MAC address can be directly used as the first lighting switching instruction message.

Similarly, if the device identifier of the light-emitting device is the device serial number of the light-emitting device, since the device serial number includes multiple numbers, a similar method can be used to pre-set the mapping relationship between the numbers and the lighting states, one number uniquely corresponding to a lighting state. A lighting state sequence formed by combining the lighting states corresponding to each number in the device serial number of the light-emitting device can be used as the first lighting switching instruction message.

The first lighting switching instruction message includes at least one lighting state. In a scenario where the first lighting switching instruction message includes at least two lighting states, it can be understood that the first lighting switching instruction message includes a lighting state switching sequence. Based on the lighting states included in the first lighting switching instruction message, the light-emitting device may switch the lighting state according to the lighting states included in the first lighting switching instruction message.

In some embodiments of the present disclosure, in a scenario where the first lighting switching instruction message includes at least two lighting states, the light-emitting device may perform periodic lighting state switching according to the first lighting switching instruction message, that is, switching is performed in a cycle according to the at least two lighting states included in the first lighting switching instruction message. In an application scenario where the lighting state may include lighting colors, the first lighting switching instruction message may be a lighting color sequence formed by at least two lighting colors.

Step 220: Obtain a lighting video collected during the lighting state switching of at least one light-emitting device according to the corresponding first lighting switching instruction message.

The lighting video may be collected through a camera on the terminal device, or may be collected through a camera on another device, and then sent to the terminal device.

In some embodiments of the present disclosure, before Step 210, the method further includes: the terminal device issues a positioning instruction, so that the light-emitting device that receives the positioning instruction may, based on the positioning instruction, perform the lighting switching according to its own first lighting switching instruction message. Further, a broadcast signal is broadcasted and, according to the positioning instruction, video collection is started to collect the lighting video of at least one light-emitting device during the switching of the lighting state.

The terminal device may broadcast the positioning instruction through its own network module, so that the light-emitting device that receives the positioning instruction may respond to the positioning instruction and switches the lighting state according to the first lighting switching instruction message of the light-emitting device itself. Moreover, the video collection device in the terminal device starts to collect the lighting video in response to the positioning instruction.

In some embodiments of the present disclosure, the positioning instruction may also indicate a time interval for switching the lighting state, so that the light-emitting device switches the lighting state according to the time interval indicated by the positioning instruction. Of course, in some other embodiments, the preset time interval for switching the lighting state can also be stored in the light-emitting device itself, so that after receiving the positioning instruction, the light-emitting device performs the lighting state switching according to the stored time interval.

In some embodiments of the present disclosure, after starting video collection, the user can trigger the end of video collection according to actual needs. In some embodiments of the present disclosure, the video duration range of the lighting video can also be preset. Therefore, after starting the video collection, when the video collection duration goes beyond the video duration range, the video collection can be automatically stopped to obtain the lighting video.

In some embodiments of the present disclosure, the minimum duration of the lighting video can also be preset. During the video collection process, if the duration of the collected video has not reached the minimum duration, when the user trigger to end the video collection is detected, the user may be prompted that the video collection duration is short and the video needs to be collected again, and the re-collected video with a duration no less than the minimum duration may be used as the lighting video.

In some embodiments of the present disclosure, in the collected lighting video, the light-emitting device switches the lighting state at least once. It can be understood that the number of lighting state switches of each light-emitting device in the lighting video needs to reach a preset number. If not, it may be caused by the fact that the number of the lighting states in the second lighting switching instruction message is less than the number of lighting states in the first lighting switching instruction message, resulting a mismatch between the first lighting switching instruction message and the second lighting switching instruction message. The preset number may be the number of the lighting states in the first lighting switching instruction message.

In some embodiments of the present disclosure, in order to ensure the accuracy of matching the first lighting switching instruction message and the second lighting switching instruction message in the subsequent processes, if the lighting state sequence indicated by the lighting state sequence in the first lighting switching instruction message is used as a switching cycle, the collected lighting video includes data in which the light-emitting device completes a switching cycle according to its corresponding first lighting switching instruction message. For example, if the lighting state sequence corresponding to the first lighting switching instruction message is red light on-green light on-blue light on-yellow light on-purple light on, the light-emitting device may, in accordance with the lighting state sequence, perform sequentially "red light on, green light on, blue light on, yellow light on, and purple light on", and the light-emitting device is deemed to have switched the lighting state for a switching cycle.

In some embodiments of the present disclosure, since the start time for the light-emitting device to start performing the lighting switching may not be completely synchronized with the start time of the video collection, in such case, the duration of the lighting video may be no less than a target cycle duration, which refers to the duration for the light-emitting device to complete a switching cycle of the lighting state switching according to its corresponding first lighting switching instruction message. Therefore, during subsequent processing, it can facilitate extracting the video frames corresponding to each lighting state included in the first lighting switching instruction message from the lighting video, thereby ensuring the accuracy of subsequent matching.

Step 230: Perform lighting state identification based on the lighting video, and determine a second lighting switching instruction message for switching the lighting state of each light-emitting device in the lighting video.

Since the lighting video is collected when the light-emitting device is in the process of lighting state switching, there are at least two video frames with different lighting states in the lighting video. Therefore, the video frames can be extracted from the lighting video and, based on the video frames, the lighting state of each light-emitting device in the video frame can be identified.

In some embodiments of the present disclosure, each light-emitting device may perform one switching cycle of the lighting state switching according to the first lighting switching instruction message, or may periodically perform multiple switching cycles of the lighting state switching according to the first lighting switching instruction message, which may be configured according to actual needs.

In one embodiment, during the lighting state switching process of the light-emitting device, the time interval between any two lighting state switches may be the same or different. In one embodiment, the time interval for the light-emitting device to switch between two lighting states can also be preset, so that the light-emitting device switches between at least two lighting states as indicated by the first lighting switching instruction message according to the preset time interval.

It can be understood that the different lighting states of the light-emitting device are directly reflected in the differences in pixels on the video frames extracted from the lighting video. For example, for the on state and the off state, the lighting states of different lighting colors, and the lighting states of different brightness levels, there are differences in the pixels. Therefore, the lighting state of each light-emitting device can be identified based on the pixel information of the pixel area where each light-emitting device is located in the video frame, and then the identified lighting states of the same light-emitting device are combined in time order to obtain the lighting state sequence. The lighting state sequence can be regarded as the second lighting switching instruction message. Like the first lighting switching instruction message, the second lighting switching instruction message includes at least one lighting state. The number of lighting states included in the second lighting switching instruction message and the number of lighting states included in the first lighting switching instruction message may be the same or different, which may be related to the duration of the lighting video.

Step 240: Match the first lighting switching instruction message indicated by the broadcast signal with the second lighting switching instruction message corresponding to each light-emitting device in the lighting video to determine the broadcast signal corresponding to each light-emitting device in the lighting video.

In Step 240, the first lighting switching instruction message indicated by each broadcast signal may be matched with the second lighting state switching instruction message corresponding to each light-emitting device in the lighting video. In some embodiments, during the matching process, after determining that a first lighting switching instruction message matches a second lighting switching instruction message, each remaining second lighting switching instruction message can be matched with each remaining lighting switching instruction message, and the process is repeated until the first lighting switching instruction message matching each second lighting switching instruction message is determined. Specifically, the first lighting switching instruction messages can be temporarily stored in a first set, and the second lighting switching instruction messages can be temporarily stored in a second set. After determining a first lighting switching instruction message in the first set (assuming the first lighting switching instruction message L1) matches a second lighting switching instruction message (assuming the second lighting switching instruction message L2) in the second set, the first lighting switching instruction message L1 is removed from the first set, and the second lighting switching instruction message L2 is removed from the second set. Then, each remaining first lighting switching instruction message in the first set is matched with each remaining second lighting switching instruction message in the second set. In certain embodiments, since the matching first lighting switching instruction message or the matching second lighting switching instruction message has been determined, and does not participate in the subsequent matching process, the amount of matching calculation is reduced and processing resource can be effectively saved.

Figure 3:
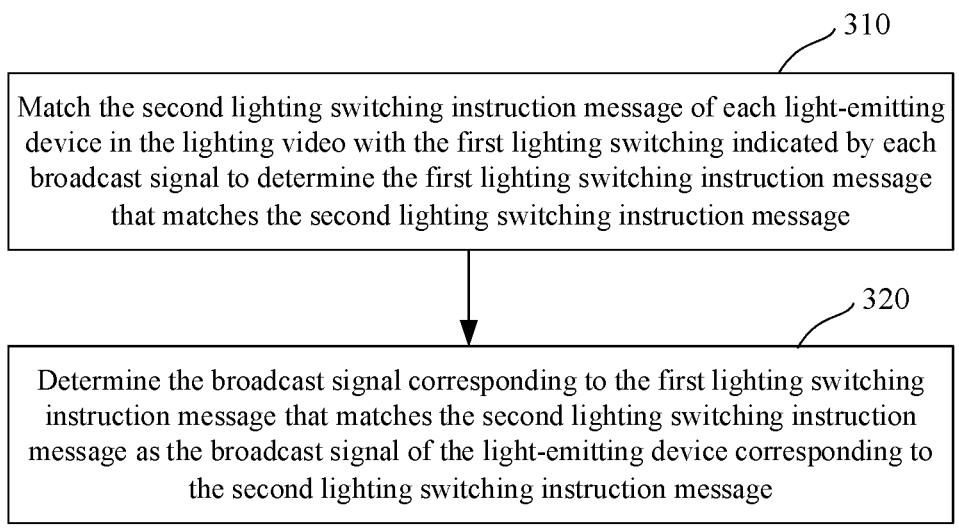
FIG. 3 is a flowchart of Step 240 according to an embodiment of the present disclosure.

In some embodiments of the present disclosure, as shown in FIG. 3, Step 240 includes: Step 310, matching the second lighting switching instruction message of each light-emitting device in the lighting video with the first lighting switching indicated by each broadcast signal to determine the first lighting switching instruction message that matches the second lighting switching instruction message. Step 320: determining the broadcast signal corresponding to the first lighting switching instruction message that matches the second lighting switching instruction message as the broadcast signal of the light-emitting device corresponding to the second lighting switching instruction message.

As described above, the number of lighting states included in the second lighting switching instruction message may exceed the number of lighting states within one switching cycle. Therefore, if a lighting state sequence corresponding to the second lighting switching instruction message contains the lighting state sequence corresponding to the first lighting switching instruction message, it can be determined that the second lighting switching instruction message matches the first lighting switching instruction message.

For example, if the lighting state sequence (lighting state sequence I) corresponding to the second lighting switching instruction message is: red light on→yellow light on→green light on→blue light on→purple light on→red light on→yellow light on→green light on→blue light on→purple light on→red light on; if the lighting state sequence (lighting state sequence II) corresponding to the first lighting switching instruction message is: red light on→yellow light on→green light on→blue light on→purple light on. It can be seen that the light status sequence I includes or contains the light status sequence II, then it can be determined that the second lighting switching instruction message of the light status sequence II matches the first lighting switching instruction message of the light status sequence I.

In some embodiments of the present disclosure, if the number of lighting states in the lighting state sequence corresponding to the second lighting switching instruction message exceeds the number of lighting states in one lighting switching cycle, a lighting state sequence corresponding to a lighting switching cycle can be extracted from the lighting state sequence corresponding to the lighting switching instruction message. The extracted lighting state sequence corresponding to a lighting switching cycle is called a reference lighting state sequence. If a reference lighting state sequence is the same as the lighting state sequence corresponding to a first lighting switching instruction message, then it is determined that the second lighting switching instruction message of the reference lighting state sequence matches the first lighting switching instruction message.

In one embodiment, during the periodic lighting state switching process according to a lighting state sequence, since any lighting state in the lighting state sequence can be used as the starting lighting state, correspondingly, for the lighting state switching process of at least two lighting switching cycles, if the starting lighting state is different, the determined final lighting state will also be different. For example, in the above lighting state sequence I, if the red light is used as the starting lighting state in a lighting switching cycle, the lighting state sequence corresponding to the lighting switching cycle is: red light on→yellow light on→green light on→blue light on→purple light on. If the green light is used as the starting lighting state in the lighting switching cycle, the lighting state sequence corresponding to the lighting switching cycle is: green light on→blue light on→purple light on→red light on→yellow light on.

In this case, the first lighting state in the lighting state sequence of the first lighting switching instruction message can be used as the starting lighting state, so that in the second lighting switching instruction message, this starting lighting state can be used as the starting point to determine the lighting state sequence corresponding to a lighting switching cycle. Then, the extracted lighting state sequence corresponding to a lighting switching cycle and the lighting state sequence corresponding to the first lighting switching instruction message are matched.

Continuing with the above example of lighting state sequences I and II, the first lighting state in the lighting state sequence II is a "red light on", then "red light on" is used as the starting lighting state. Starting with the "red light on", the lighting state sequence corresponding to a light switching cycle is extracted from the lighting state sequence I as: red light on→yellow light on→green light on→blue light on→purple light on. The extracted lighting state sequence corresponding to a light switching cycle is a reference lighting state sequence. It can be seen that the reference lighting state sequence and lighting state sequence II are the same. Therefore, the second lighting switching instruction message of the reference lighting state sequence matches the first lighting switching instruction message of the lighting state sequence II.

In some embodiments of the present disclosure, if each light-emitting device in the lighting video periodically switches the lighting state according to its corresponding first lighting switching instruction message, the lighting state sequence corresponding to the first lighting switching instruction message can also form a closed-loop lighting state sequence (assuming as a target closed-loop sequence). During the matching process, a lighting state is randomly selected from the lighting state sequence corresponding to the first lighting switching instruction message. This lighting state is used as the starting lighting state and, then, starting from the starting lighting state, a lighting state sequence corresponding to a lighting switching cycle is determined in the target closed-loop sequence as the target lighting state sequence. Further, according to this starting lighting state, a lighting state sequence corresponding to a lighting switching cycle is extracted from the lighting state sequence corresponding to the second lighting switching instruction message. If the extracted lighting state sequence corresponding to a lighting switching cycle is the same as the target lighting state sequence, it is determined that the first lighting switching instruction message matches the second lighting switching instruction message.

Figure 4:
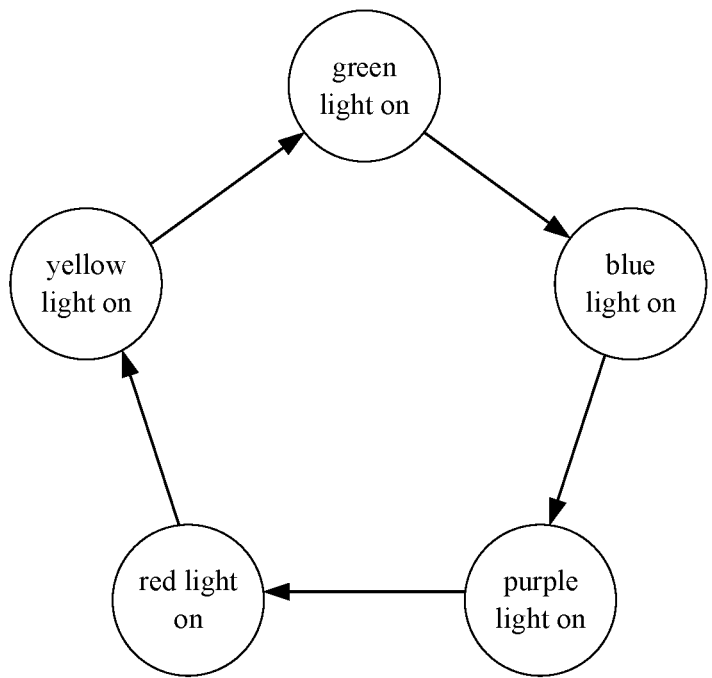
FIG. 4 is a schematic diagram of a closed-loop lighting state sequence according to an embodiment of the present disclosure.

Continuing with the above examples of lighting state sequences I and II, the closed-loop lighting state sequence formed based on lighting state sequence I is shown in FIG. 4. If "green light on" is selected as the starting lighting state, following the lighting state switching direction shown in FIG. 4, the target lighting state sequence determined from the closed-loop lighting state sequence shown in FIG. 4 is: green light on→blue light on→purple light on→red light on→yellow light on. In the lighting state sequence II, taking "green light on" as the starting lighting state, the extracted lighting state sequence corresponding to a lighting switching cycle is: green light on→blue light on→purple light on→red light on→yellow light on. Obviously, the lighting state sequence corresponding to a lighting switching cycle extracted from the lighting state sequence II is the same as the target lighting sequence determined from the lighting state sequence I.

In some embodiments of the present disclosure, in the process of matching the first lighting switching instruction message with the second lighting switching instruction message, a target matching degree may be used to determine whether the first lighting switching instruction message and the second lighting switching instruction message match. If the target matching degree is not lower than a matching degree threshold, it is determined that the first lighting switching instruction message matches the second lighting switching instruction message. In certain embodiments, the matching degree threshold can be set according to actual needs, such as 90%, 95%, 100%, etc., which is not specifically limited here. The target matching degree may be equal to the ratio of value S1 and value S2, where the value S2 is equal to the number of lighting states in the lighting state sequence corresponding to the first lighting switching instruction message; and the value S1 is equal to the number of lighting states in the same lighting state sequence. The same lighting state sequence refers to the same lighting sequence segment in the first lighting state sequence and the second lighting state sequence, and the first lighting state sequence refers to the lighting state sequence corresponding to the first lighting switching instruction message, and the second lighting state sequence refers to the lighting state sequence corresponding to the second lighting switching instruction message.

In one embodiment, if the number of lighting states included in the second lighting switching instruction message is less than the number of lighting states included in the first lighting switching instruction message, the above examples based on the target matching degree may be used to determine whether a second lighting switching instruction message matches a first lighting switching instruction message.

In Step 240, by matching the first lighting switching instruction message with the second lighting switching instruction message, the light-emitting device in the lighting video is corresponding to the light-emitting device from the received broadcast signal. That is, if a second lighting switching instruction message (assuming the second lighting switching instruction message T1) matches a first lighting switching instruction message (assuming the first lighting switching instruction message T2), it can be determined that the light-emitting device corresponding to the lighting switching instruction message T1 in the lighting video is the same light-emitting device as the light-emitting device corresponding to the broadcast signal of the first lighting switching instruction message T2, thereby realizing the correspondence between the light-emitting device in the lighting video and the light-emitting device of the broadcast signal. Thus, subsequently, the user can visually control the light-emitting device in the actual physical environment based on the lighting video. That is, the user can know which light-emitting device in the actual physical environment corresponds to the currently triggered light-emitting device, or when the user determines that a light-emitting device in the actual physical environment needs to be controlled, the user can determine the target to be triggered based on the lighting video.

By matching the first lighting switching instruction message with the second lighting switching instruction message, it can identify the broadcast signals originating from each light-emitting device in the lighting video. That is, if it is determined that the light-emitting device corresponding to the second lighting switching instruction message T1 in the lighting video is the same light-emitting device as the light-emitting device for the broadcast signal corresponding to the first lighting switching instruction message T2, it can be determined that the broadcast signal corresponding to the first lighting switching instruction message T2 originates from the light-emitting device corresponding to the second lighting switching instruction message T1 in the light video.

In some embodiments of the present disclosure, due to the limited video collection angle of the video collection device, there may be a difference between the number of light-emitting devices in the light video and the number of received broadcast signals. In one embodiment, multiple light-emitting devices can be placed together, so that during the video collection process, the collected lighting video includes video data of the multiple light-emitting devices whose network locations are to be determined.

Continuing to refer to FIG. 2, Step 250, determine the network address of each light-emitting device in the lighting video based on the determined broadcast signal corresponding to each light-emitting device in the lighting video.

In some embodiments of the present disclosure, the broadcast signal may carry the network address of the corresponding light-emitting device. Therefore, after determining the broadcast signal corresponding to each light-emitting device in the lighting video, the network address carried by the broadcast signal is used as the network address of the corresponding light-emitting device in the light video.

In some implementations of the present disclosure, when the device identifier of the light-emitting device is the network address of the network module in the light-emitting device, the first lighting switching instruction message broadcasted by the light-emitting device is based on the device identifier of the light-emitting device (i.e., the network address). Therefore, after determining the broadcast signal corresponding to each light-emitting device in the lighting video, reverse analysis is performed based on the broadcast signal to obtain the network address of each light-emitting device in the lighting video.

For example, if the first lighting switching instruction message is generated based on the MAC address of the Bluetooth module in the light-emitting device, based on the mapping relationship between the numbers in the MAC address and the lighting state, and according to the lighting state sequence indicated in the first lighting switching instruction message, the MAC address corresponding to the lighting state sequence indicated by the first lighting switching instruction message can be reversely determined.

Step 260: According to the network address of each light-emitting device in the lighting video, control the corresponding light-emitting device.

After determining the network address of each light-emitting device in the lighting video, the user can trigger the corresponding light-emitting device, so that the terminal device sends a control instruction to the corresponding light-emitting device according to the network address of the triggered light-emitting device, so that the light-emitting device can switch its own lighting state based on the control instruction.

In the solutions of this disclosure, the broadcast signal broadcasted by the light-emitting device is received and the lighting state is identified according to the lighting video of the light-emitting device, and the second lighting switching instruction message of each light-emitting device in the lighting video is determined for the lighting state switching. The first lighting switching instruction message is matched with the second lighting switching instruction message, thereby corresponding the light-emitting device in the lighting video with the light-emitting device from which the received broadcast signal comes. Then, the broadcast signal of each light-emitting device in the light video is determined and, correspondingly, the network addresses of each light-emitting device in the light video is determined. Based on the determined network addresses of each light-emitting device in the light video, the light-emitting devices in the light video can be controlled. Thus, the user is not required to try each light-emitting device one by one, and the network address of the light-emitting device can be automatically obtained without the user controlling the light-emitting device. Compared with the solution in the prior art, the number of manual operations can be reduced, and the operations are simple, improving the control efficiency of light-emitting device.

Moreover, since the lighting video indicates the location of the light-emitting device in the actual physical environment, it is convenient for the user to, based on the obtained lighting video and the determined network address of each light-emitting device in the lighting video, perform visual control of the light-emitting devices. That is, the user can determine the location of the light-emitting device to be controlled in the actual physical environment based on the lighting video, improving the user experience.

Figure 5:
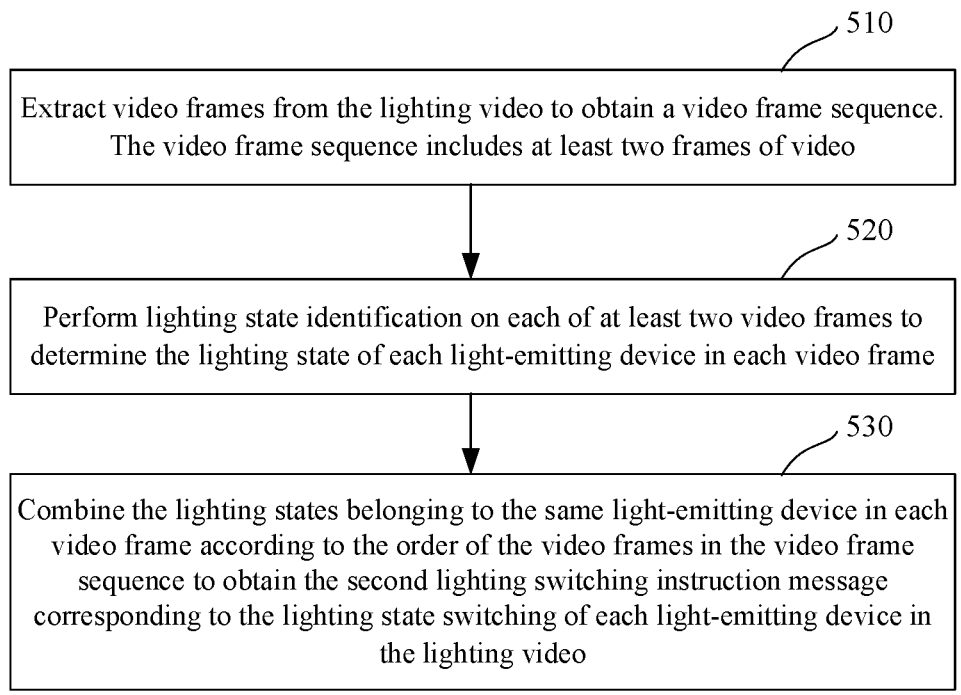
FIG. 5 is a flowchart of Step 230 according to an embodiment of the present disclosure.

In some embodiments of the present disclosure, as shown in FIG. 5, Step 230 further includes the following.

Step 510: Extract video frames from the lighting video to obtain a video frame sequence. The video frame sequence includes at least two frames of video.

In some embodiments of the present disclosure, video frames can be extracted from the lighting video according to a preset first time interval, and the extracted video frames are arranged in chronological order to obtain a video frame sequence.

In some implementations of the present disclosure, video frames can be extracted from the lighting video according to a preset frame rate to obtain a video frame sequence; the preset frame rate is determined based on the time interval at which the light-emitting device switches the lighting state.

The frame rate refers to the number of video frames played per second. Specifically, in this solution, the frame rate refers to the number of video frames extracted from the light video per second. The preset frame rate refers to the preset number of video frames extracted from the light video per second. It can be seen that the reciprocal of the preset frame rate is equal to the time interval between two video frames extracted in the video frame, that is, the corresponding time difference between the time corresponding to one video frame in the light video and the time corresponding to the other video frame in the light video.

On the basis that the light-emitting device switches the lighting state according to the preset time interval, correspondingly, in the lighting video, the light-emitting device also switches the lighting state according to the set time interval. In this case, in order to save processing resources and avoid invalid lighting state identification, the preset time interval is used as the time interval for extracting two video frames. That is, in one embodiment, the reciprocal of the preset frame rate is equal to the time interval for the light-emitting device to switch the lighting state, keeping the time interval between two video frames extracted from the light video the same as the time interval between two adjacent lighting state switches.

Step 520: Perform lighting state identification on each of at least two video frames to determine the lighting state of each light-emitting device in each video frame.

Figure 6:
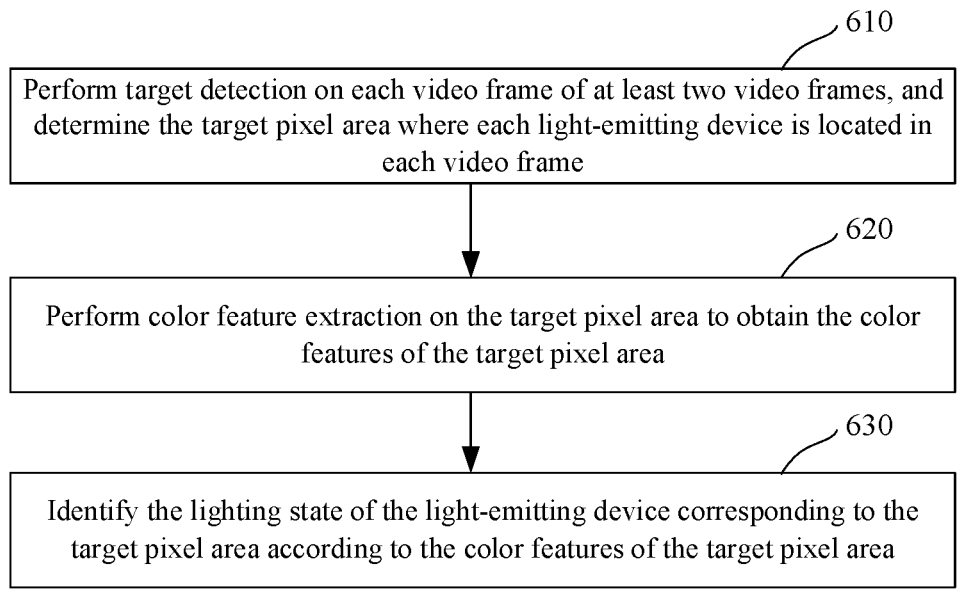
FIG. 6 is a flowchart of Step 520 according to an embodiment of the present disclosure.

In some embodiments of the present disclosure, deep learning may be used to identify the lighting state. Specifically, as shown in FIG. 6, Step 520 includes: step 610, perform target detection on each video frame of at least two video frames, and determine the target pixel area where each light-emitting device is located in each video frame; step 620, perform color feature extraction on the target pixel area to obtain the color features of the target pixel area; step 630, identify the lighting state of the light-emitting device corresponding to the target pixel area according to the color features of the target pixel area.

Further, the target pixel area refers to the pixel area where the light-emitting device is located in the video frame. Target detection on the video frame refers to detecting and determining the pixel area in the video frame where the light-emitting device is located. By performing target detection on the video frame, the pixels in the video frame are classified, thereby determining the target pixel area corresponding to each light-emitting device in the video frame, and determining the position information of each target pixel area in the video frame.

In some embodiments of the present disclosure, target detection can be performed on video frames through a trained target detection model. For example, the target detection model can be a model built through a convolutional neural network (CNN), such as Region CNN (Region Convolutional Neural Network), SPPNet (Spatial Pyramid Pooling in Deep Convolutional Networks, convolution network based on pyramid fusion), YOLO (You Only Look Once) based algorithm, etc., there are no specific limitations here.

In some embodiments of the present disclosure, the color features include HSV features; the lighting state includes the lighting color; in one embodiment, Step 620 includes: transforming the target pixel area into the HSV color space to obtain the HSV features of the target pixel area; Step 630 includes: performing color classification according to the HSV features of the target pixel area through a color classifier to obtain a color classification result, which is used to indicate the lighting color of the light-emitting device indicated by the target pixel area.

The HSV (Hue, Saturation, Value) color space refers to a color space model created based on the intuitive characteristics of color, also known as the hexagonal cone model. The parameters of color in this model are hue (H), saturation (S) and value (V). Among them, the hue H is measured in angle, and the value range is 0°~360°, starting from red and counting in the counterclockwise direction, red is 0°, green is 120°, and blue is 240°. Saturation S indicates the degree to which a color is close to a spectral color. A color can be regarded as the result of mixing a spectral color and white. The value of saturation ranges from 0 to 100%. The larger the value, the more saturated the color. Value V indicates how bright a color is, and its value ranges from 0% (black) to 100% (white).

In one embodiment, converting the target pixel area to HSV color means expressing the color information of each pixel in the target pixel area through three values: hue, saturation, and brightness. Therefore, the extracted HSV features include the hue, saturation, and brightness of each pixel in the target pixel area.

The color classifier can be a classifier built based on the KNN (K-Nearest Neighbors) algorithm or a classifier built based on the SVN (Support Vector Machine) algorithm. In some embodiments of the present disclosure, color classification can also be performed through the SSD model (Single Shot MultiBox Detector).

Step 530: Combine the lighting states belonging to the same light-emitting device in each video frame according to the order of the video frames in the video frame sequence to obtain the second lighting switching instruction message corresponding to the lighting state switching of each light-emitting device in the lighting video.

For each video frame in the video frame sequence, the lighting state of each light-emitting device in the video frame can be correspondingly identified and determined. Therefore, according to the order of the video frames in the video frame sequence, the identified lighting states corresponding to the same light-emitting device in the video frames can be combined to form the lighting state sequence of each light-emitting device in the lighting video. The obtained lighting state sequence of each light-emitting device in the lighting video is the second lighting switching instruction message of the corresponding light-emitting device.

Figure 7:
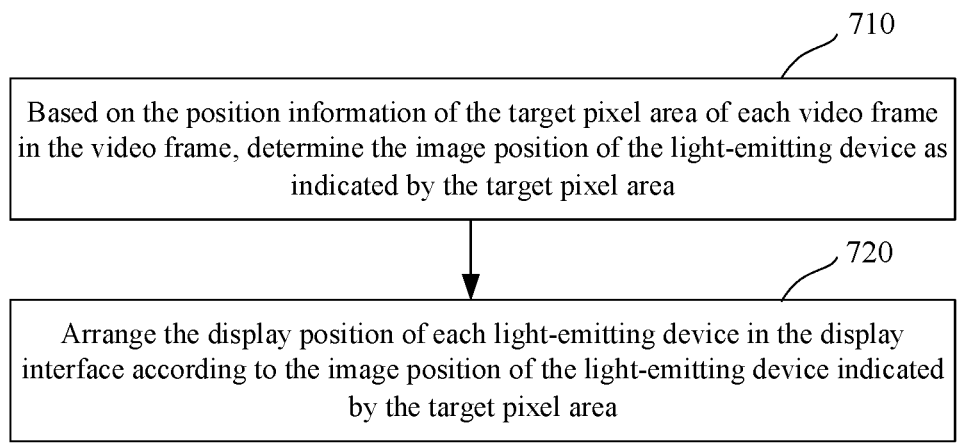
FIG. 7 is a flowchart of a method for controlling light-emitting devices according to another embodiment of the present disclosure.

In some embodiments of the present disclosure, as shown in FIG. 7, the light-emitting device control method further includes the following.

Step 710: Based on the position information of the target pixel area of each video frame in the video frame, determine the image position of the light-emitting device as indicated by the target pixel area.

As described above, after target detection is performed to determine the target pixel area where each light-emitting device is located in the video frame, the position information of the target pixel area in the video frame is correspondingly determined. On this basis, the image position of the light-emitting device can be determined based on the position information of the target pixel area corresponding to the same light-emitting device in the video frame.

Since the size of each video frame in the lighting video is the same and, generally speaking, the position of the light-emitting device in the actual physical environment remains unchanged, therefore, if the acquisition angle remains unchanged during the lighting video collection, in the lighting video, the position of the target pixel area of each light-emitting device in each video frame is basically the same. On this basis, the position of the union area of multiple target pixel areas for the same light-emitting device can be used as the image position of the corresponding light-emitting device. In other embodiments, the position of the intersection area of multiple target pixel areas for the same light-emitting device can also be used as the image position of the corresponding light-emitting device. Further, based on the determined union area or intersection area, the union area (or intersection area) can be enlarged according to a preset amplification factor, and the position of the enlarged area is used as the image position of the corresponding light-emitting device.

Step 720: Arrange the display position of each light-emitting device in the display interface according to the image position of the light-emitting device indicated by the target pixel area.

The display interface may be an interface for an application program that controls the light-emitting devices. In the display interface, a corresponding icon may be displayed for each light-emitting device. The display position of the light-emitting device in the display interface may be understood as the position of the icon representing the location of the light-emitting device in the display interface.

In some embodiments of the present disclosure, the display position of the light-emitting devices in the display interface can be arranged according to the relative positional relationship among the light-emitting devices in the lighting video. Therefore, the relative position of the icons representing the light-emitting devices in the display interface directly reflects the relative positions of the light-emitting devices in the actual environment, thereby facilitating the user to correlate the icons displayed in the display interface with the positions of the light-emitting devices in the actual environment. That is, the user can quickly determine the position of the light-emitting device represented by the icon in the actual environment directly based on the display position of the icon in the display interface, realizing the visualization of the light-emitting devices in the display interface.

Figure 8:
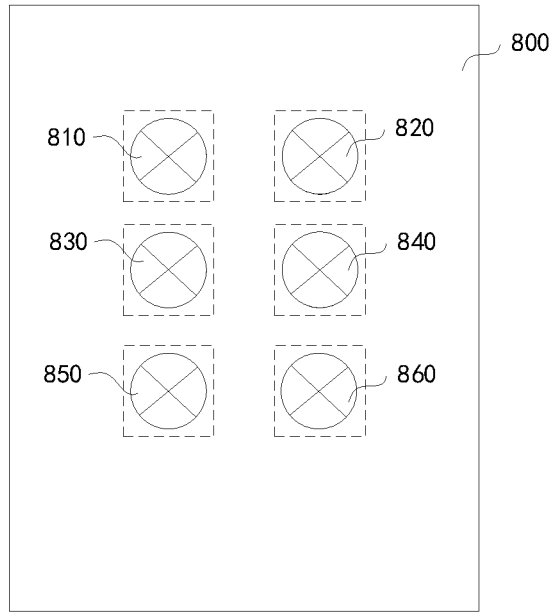
FIG. 8 is a schematic diagram of icons corresponding to light-emitting devices in a display interface according to an embodiment of the present disclosure.

FIG. 8 is a schematic diagram of the icons of the light-emitting devices displayed in the display interface according to one embodiment of the present disclosure. As shown in FIG. 8, the display interface 800 exemplarily shows six icons representing light-emitting devices. Each icon represents a light-emitting device, which are a first icon 810, a second icon 820, a third icon 830, a fourth icon 840, a fifth icon 850, and a sixth icon 860. The relative position relationship between icons is the same as the relative position relationship of the light-emitting devices represented by the icons in the actual environment. Therefore, the user can directly locate the position of the light-emitting device represented by each icon in the actual environment according to the icon in the display interface. This technology facilitates users to visibly control light-emitting devices based on icons in the display interface.

In some embodiments of the present disclosure, a two-dimensional or three-dimensional model of each light-emitting device in the display interface can also be established based on the light-emitting device shown in the video frame in the lighting video. In the display interface, the position of the model corresponding to the light-emitting device is the display position of the light-emitting device indicated by the model in the display interface.

Figure 9:
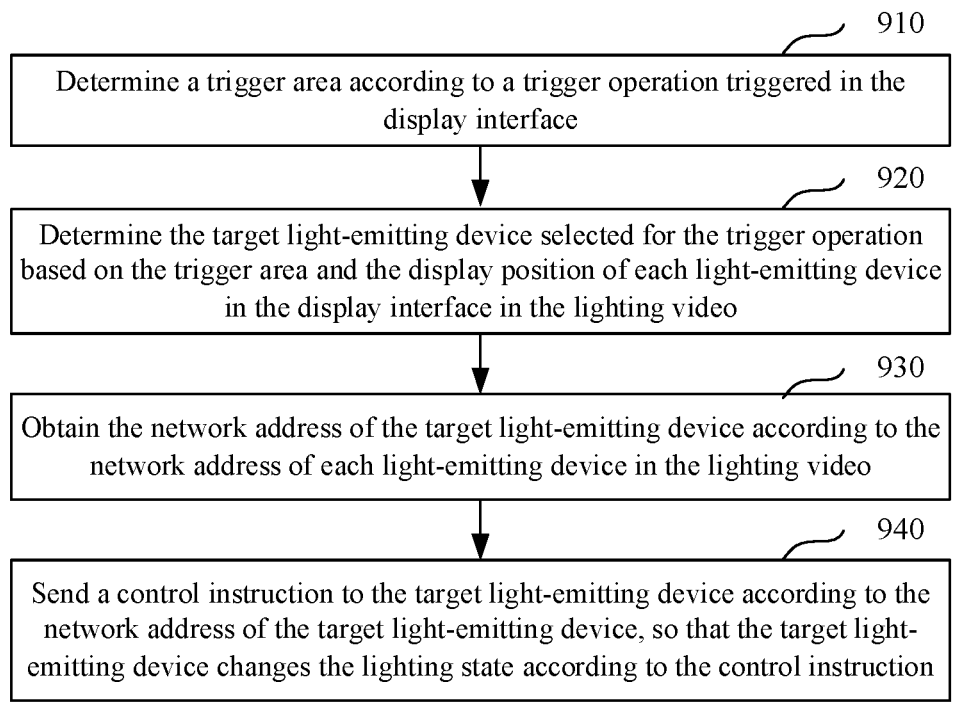
FIG. 9 is a flowchart of Step 260 according to an embodiment of the present disclosure.

In some embodiments of the present disclosure, as shown in FIG. 9, Step 260 includes the following.

Step 910: Determine a trigger area according to a trigger operation triggered in the display interface. The trigger area is the area triggered by the trigger operation.

Step 920: Determine the target light-emitting device selected for the trigger operation based on the trigger area and the display position of each light-emitting device in the display interface in the lighting video.

According to the position information of the trigger area in the display interface and the display position of each light-emitting device in the display interface, it can be determined whether the trigger area belongs to the display area corresponding to a certain light-emitting device in the display interface. If the trigger area belongs to the display area in the display interface of a certain light-emitting device, the light-emitting device corresponding to the display area is the target light-emitting device selected by the trigger operation.

Step 930: Obtain the network address of the target light-emitting device according to the network address of each light-emitting device in the lighting video.

After determining the target light-emitting device selected for the triggering operation, the network address of the target light-emitting device can be determined correspondingly from the network address of each light-emitting device in the determined lighting video.

Step 940: Send a control instruction to the target light-emitting device according to the network address of the target light-emitting device, so that the target light-emitting device changes the lighting state according to the control instruction.

The control instruction may be an instruction to instruct the corresponding light-emitting device to switch the lighting state. The control instruction may instruct the corresponding light-emitting device to switch to the lighting state, such as off, red light on, green light on, brightness level II, etc., which are not specifically limited here.

In some embodiments of the present disclosure, a video frame can also be selected from the lighting video as the target image, and then the target image can be embedded and displayed in the display interface. In some embodiments of the present disclosure, the target image can be further edited, for example, cropped, so that the cropped image is embedded and displayed in the display interface, where the cropped image includes the target pixel area of each light-emitting device. In this case, when it is detected that the user triggers a certain light-emitting device (target light-emitting device) in the selected target image, the network address of the selected light-emitting device can be determined based on the mapping relationship between the image position of the light-emitting devices and the network addresses of the light-emitting devices. The control instruction is then sent to the target light-emitting device according to the network address of the target light-emitting device.

Figure 10:
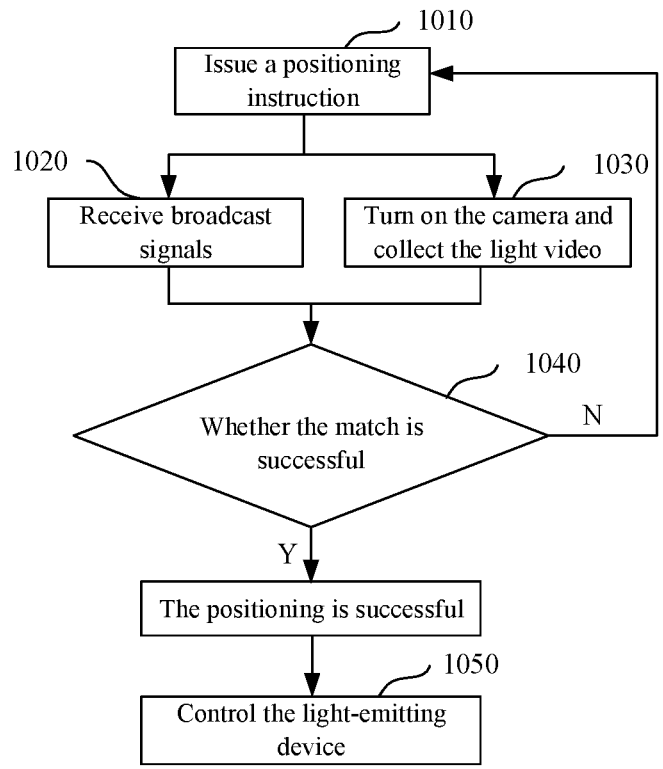
FIG. 10 is a flow chart illustrating a method for controlling light-emitting device implemented on the terminal device side according to an embodiment of the present disclosure.

FIG. 10 is a flow chart illustrating a light-emitting device control method implemented on the terminal device side according to one embodiment of the present disclosure. As shown in FIG. 10, the method can include the following.

Step 1010: Issue a positioning instruction.

Step 1020: Receive broadcast signals. That is, broadcast signals from the light-emitting devices are received, and the broadcast signal is used for the first lighting switching instruction message to instruct the corresponding light-emitting device to perform lighting state switching.

Step 1030: Turn on the camera and collect the light video. The terminal device is equipped with a camera. In response to the issued positioning command, the terminal device turns on the camera and collects the video of the light-emitting device during the lighting state switching according to its corresponding first lighting switching instruction message to obtain the lighting video.

Step 1040, determine whether the match is successful. In some embodiments, if there is no matching first lighting switching instruction message and second lighting switching instruction message in the second lighting switching instruction messages and the first lighting switching instruction messages, it is determined that the matching fails. Otherwise, if there is matching first lighting switching instruction message and second bright lighting switching instruction message, it is determined that the matching is successful.

If the match is successful, it is determined that the positioning is successful. That is, it is determined that the light-emitting device in the lighting video is associated with the network address of the light-emitting device in the physical environment, and then Step 1050 is executed to control the light-emitting device. That is, according to the network address of the light-emitting device, the control instruction is sent to the light-emitting device. If the matching fails, return to Step 1010 and restart positioning, so that the terminal device re-issues positioning instructions and re-collects the lighting video.

Figure 11:
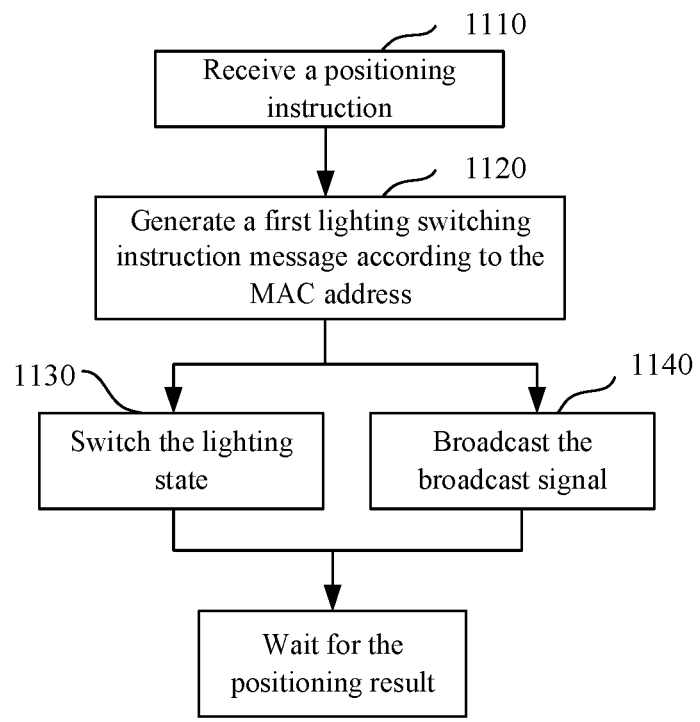
FIG. 11 is a flow chart illustrating a light-emitting device control method implemented on the light-emitting device side according to an embodiment of the present disclosure.

FIG. 11 is a flow chart illustrating a light-emitting device control method implemented on the light-emitting device side according to one embodiment of the present disclosure. As shown in FIG. 11, the method can include the following.

Step 1110: Receive a positioning instruction. The positioning instruction is the instruction for positioning broadcasted by the terminal device.

Step 1120: Generate a first lighting switching instruction message according to the MAC address. The light-emitting device is provided with a Bluetooth module, and the MAC address is the MAC address of the Bluetooth module. The process of generating the first lighting switching instruction message according to the MAC address is as described above and will not be described again here.

Step 1130, Switch the lighting state. The light-emitting device performs lighting state switching according to the lighting state sequence in the generated first lighting switching instruction message. Therefore, after the terminal device starts the camera, it can collect the lighting video of the light-emitting device performing lighting state switching according to the first lighting switching instruction message.

Step 1140: Broadcast the broadcast signal. The light-emitting device broadcasts a broadcast signal carrying its first lighting switching instruction message to the outside world.

Further, wait for the positioning result of the terminal device. That is, the terminal device determines the network address of each light-emitting device in the lighting video according to the first lighting switching instruction message and the lighting video according to the processes in FIG. 9 and above embodiments. Further, the terminal device controls the light-emitting device according to the network address of the light-emitting device.

The following describes device embodiments of the present disclosure, which can be used to perform the methods in the above embodiments of the present disclosure. For details not disclosed in the device embodiments of this disclosure, please refer to the above method embodiments of this disclosure.

Figure 12:
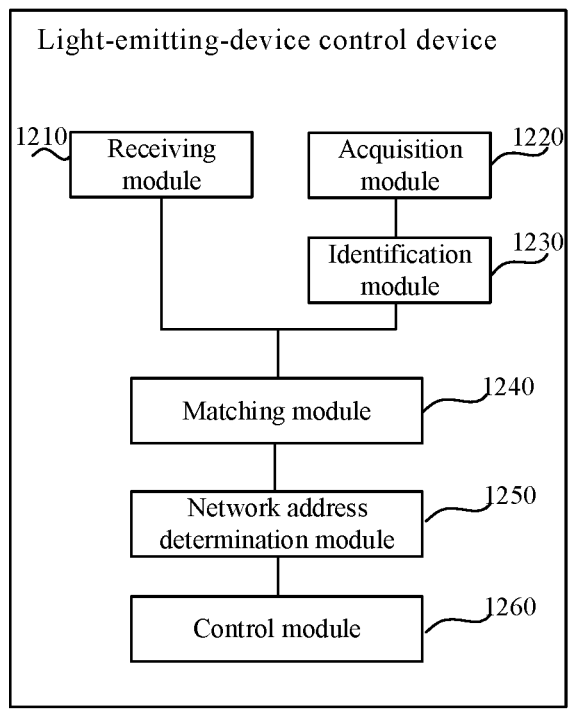
FIG. 12 is a block diagram of a device for controlling light-emitting devices according to an embodiment of the present disclosure.

FIG. 12 is a block diagram of a device for controlling light-emitting devices according to an embodiment of the present disclosure. As shown in FIG. 12, the device for controlling light-emitting devices includes: a receiving module 1210 for receiving a broadcast signal broadcast by at least one light-emitting device. The broadcast signal is used to indicate the first lighting switching instruction message based on which the corresponding light-emitting device switches the lighting state; the first lighting switching instruction message is determined based on the device identifier of the light-emitting device; the light-emitting device is equipped with a network module, and the light-emitting device broadcasts a broadcast signal through the network module; an acquisition module 1220, which is used to acquire the lighting video collected during the lighting state switching of at least one light-emitting device according to the corresponding first lighting switching instruction message; an identification module 1230, which is used to perform lighting state identification based on the lighting video to determine the second lighting switching instruction message for switching the lighting state of each light-emitting device in the lighting video; a matching module 1240, which is used to match the first lighting switching indicated by the broadcast signal with the second lighting switching instruction message corresponding to each light-emitting device in the lighting video to determine the broadcast signal corresponding to each light-emitting device in the lighting video; a network address determination module 1250, which is used to the network address of each light-emitting device in the lighting video according to the determined broadcast signal corresponding to each light-emitting device in the lighting video; a control module 1260, which is used to control the corresponding light-emitting device according to the network address of each light-emitting device in the lighting video.

In some embodiments of the present disclosure, the matching module 1240 includes: a matching unit configured to match the second lighting switching instruction message of each light-emitting device in the lighting video with the first lighting switching indicated by each broadcast signal to determine the first lighting switching instruction message that matches the second lighting switching instruction message; a broadcast signal determination unit configured to determine the broadcast signal corresponding to the first lighting switching instruction message that matches the second lighting switching instruction message as the broadcast signal of the light-emitting device corresponding to the second lighting switching instruction message.

In some embodiments of the present disclosure, the identification module 1230 includes: a video frame extraction unit, used to extract video frames in the lighting video to obtain a video frame sequence, where the video frame sequence includes at least two video frames; a lighting state identifying unit, used to perform lighting state identification on each of at least two video frames to determine the lighting state of each light-emitting device in each video frame; a combination unit, used to combine the lighting states belonging to the same light-emitting device in each video frame according to the order of the video frames in the video frame sequence to obtain the second lighting switching instruction message corresponding to the lighting state switching of each light-emitting device in the lighting video.

In some embodiments of the present disclosure, the video frame extraction unit is further configured to: extract video frames from the lighting video according to a preset frame rate to obtain a video frame sequence; the preset frame rate is determined based on the time interval at which the light-emitting device switches the lighting state.

In some embodiments of the present disclosure, the lighting state identification unit includes: a target detection unit, used to perform target detection on each video frame of at least two video frames, and determine the target pixel area where each light-emitting device is located in each video frame; a color feature extraction unit, used to perform color feature extraction on the target pixel area to obtain the color features of the target pixel area; an identification unit, used to identify the lighting state of the light-emitting device corresponding to the target pixel area according to the color features of the target pixel area.

In some embodiments of the present disclosure, the color features include HSV features; the lighting state includes lighting color; and the color feature extraction unit is further configured to: transform the target pixel area into the HSV color space to obtain the HSV features of the target pixel area. In one embodiment, the identification unit is further configured to perform color classification according to the HSV features of the target pixel area through a color classifier to obtain a color classification result, and the color classification result is used to indicate the lighting color of the light-emitting device indicated by the target pixel area.

In some embodiments of the present disclosure, the device for controlling light-emitting devices further includes: an image position determination module, configured to determine the image position of the light-emitting device as indicated by the target pixel area according to the position information of the target pixel area in each video frame in the video frame; a display position determination module, used to arrange the display position of each light-emitting device in the display interface according to the image position of the light-emitting device indicated by the target pixel area.

In some embodiments of the present disclosure, the control module 1260 includes: a trigger area determination unit, configured to determine a trigger area according to a trigger operation triggered in the display interface; a target light-emitting device determination unit, configured to determine the target light-emitting device selected for the trigger operation based on the trigger area and the display position of each light-emitting device in the display interface in the lighting video; a network address determination unit, used to the network address of the target light-emitting device according to the network address of each light-emitting device in the lighting video; an instruction sending unit, configured to send a control instruction to the target light-emitting device according to the network address of the target light-emitting device, so that the target light-emitting device changes the lighting state according to the control instruction.

In some embodiments of the present disclosure, the device for controlling light-emitting devices further includes: a positioning instruction issuance module, configured to issue a positioning instruction, so that the light-emitting device that receives the positioning instruction performs, according to the positioning instruction, lighting state switching based on its own first lighting switching instruction message and broadcasts a broadcast signal; a video collection starting module, used to start video collection according to the positioning instruction to collect the lighting video of at least one light-emitting device during the switching of the lighting state.

In some embodiments of the present disclosure, the network module is a Bluetooth module; and the device identifier is the MAC address of the Bluetooth module in the light-emitting device.

This disclosure also provides a light-emitting device. The light-emitting device is provided with a network module. The light-emitting device broadcasts a broadcast signal through the network module, so that the terminal device that receives the broadcast signal controls the light-emitting device according to the methods provided in the above embodiments.

Figure 13:
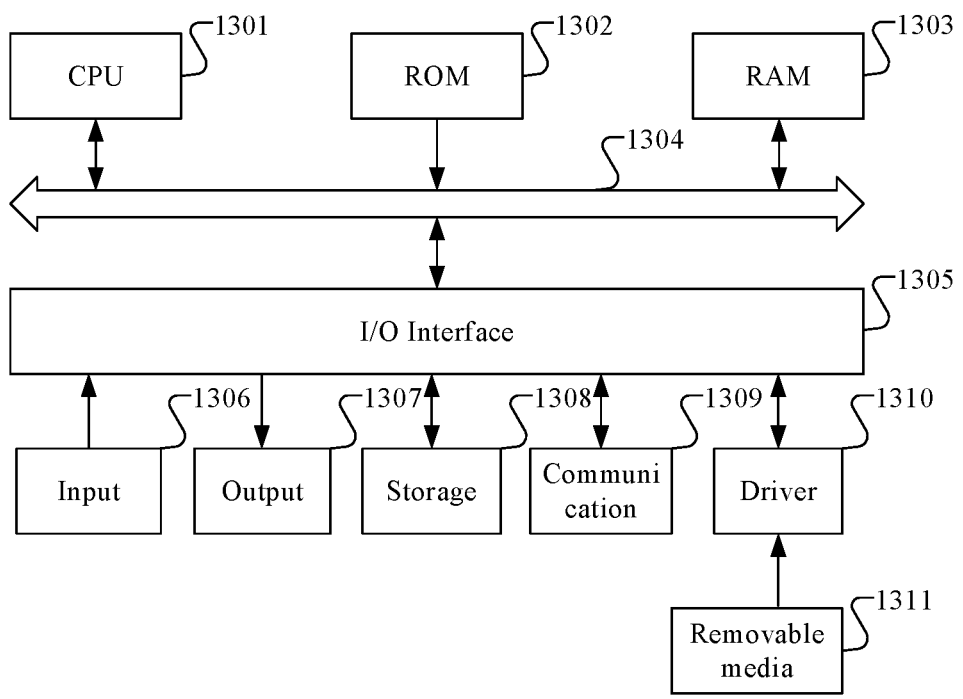
FIG. 13 shows a schematic structural diagram of a computer system suitable for implementing an electronic device according to an embodiment of the present disclosure.

FIG. 13 shows a schematic structural diagram of a computer system suitable for implementing an electronic device according to an embodiment of the present disclosure. It should be noted that the computer system 1300 of the electronic device shown in FIG. 13 is only an example, and should not impose any restrictions on the functions and scope of use of the embodiments of the present disclosure.

As shown in FIG. 13, the computer system 1300 includes a central processing unit (CPU) 1301, which can load computer programs stored in a read-only memory (ROM) 1302 or a storage 1308 into a random access memory (RAM) 1303 to perform various appropriate actions and processing, such as performing the methods in the above embodiments. In RAM 1303, various programs and data required for system operation are also stored. CPU 1301, ROM 1302, and RAM 1303 are connected to each other via bus 1304. An input/output (I/O) interface 1305 is also connected to bus 1304.

The following components are connected to the I/O interface 1305: an input part 1306 including a keyboard, a mouse, etc.; an output part 1307 including a cathode ray tube (CRT), a liquid crystal display (LCD), etc., and a speaker, etc.; a storage part 1308 including a hard disk, etc.; and a communication part 1309 including a network interface card such as a LAN (Local Area Network) card, a modem, etc. The communication part 1309 performs communication processing via a network such as the Internet. Driver 1310 is also connected to I/O interface 1305 as needed. Removable media 1311, such as magnetic disks, optical disks, magneto-optical disks, semiconductor memories, etc., are installed on the drive 1310 as needed, so that a computer program can be read out and installed into the storage portion 1308 as needed.

Accordingly, under the embodiments of the present disclosure, the processes described above with reference to the flowcharts may be implemented as a computer software program. For example, embodiments of the present disclosure include a computer program product including a computer program carried on a computer-readable medium, the computer program containing program code for performing the methods illustrated in the flowcharts. In such embodiments, the computer program may be downloaded and installed from the network via communications part 1309, and/or installed from removable media 1311. When the computer program is executed by the central processing unit (CPU) 1301, various functions defined in the systems of the present disclosure can be executed.

It should be noted that the computer-readable medium shown in the embodiments of the present disclosure may be a computer-readable signal medium or a computer-readable storage medium, or any combination of the above two. The computer-readable storage medium may be, for example, but is not limited to, an electrical, magnetic, optical, electromagnetic, infrared, or semiconductor system, apparatus or device, or any combination thereof. More specific examples of computer readable storage media may include, but are not limited to: an electrical connection having one or more wires, a portable computer disk, a hard drive, random access memory (RAM), read only memory (ROM), removable Erasable Programmable Read Only Memory (EPROM), flash memory, optical fiber, portable compact disk read-only memory (CD-ROM), optical storage device, magnetic storage device, or any combination of the above devices. As used herein, a computer-readable storage medium may be any tangible medium that contains or stores a program for use by or in connection with an instruction execution system, apparatus, or device. In this disclosure, the computer-readable signal medium may include a data signal propagated in baseband or as part of a carrier wave, in which computer-readable program code is carried. Such propagated data signals may take many forms, including but not limited to, electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device. Program code embodied on a computer-readable medium may be transmitted using any suitable medium, including but not limited to: wireless, wired, etc., or any suitable combination of the above.

The flowcharts and block diagrams in the accompanying drawings illustrate the architecture, functionality, and operations of possible implementations of systems, methods, and computer program products according to various embodiments of the present disclosure. Each block in the flow chart or block diagram may represent a module, program segment, or part of the code. The above-mentioned modules, program segments, or part of the code includes one or more executable instructions for implementing the specified logical functions. It should also be noted that, in some alternative implementations, the functions noted in the blocks may occur out of the order noted in the Figures. For example, two blocks shown one after another may actually execute substantially in parallel, or they may sometimes execute in the reverse order, depending on the functionality involved. It will also be noted that each block in the block diagram or flowchart illustration, and combinations of blocks in the block diagram or flowchart illustration, can be implemented by special purpose hardware-based systems that perform the specified functions or operations, or may be implemented by a combination of specialized hardware and computer instructions.

The units involved in the embodiments of this disclosure can be implemented in software, or can be implemented in hardware, and the described units can also be provided in a processor. Further, the names of these units do not constitute a limitation on the unit itself under certain circumstances.

As another aspect, this disclosure also provides a computer-readable storage medium. The computer-readable medium may be included in the electronic device described in the above embodiments; it may also exist independently without being assembled into the electronic device. The computer-readable storage medium carries computer-readable instructions for, when the computer-readable storage instructions are executed by the processor, implementing the methods in any of the above embodiments.

According to one aspect of the present disclosure, an electronic device is also provided, which includes: a processor; and a memory. Computer-readable instructions are stored in the memory and, when the computer-readable instructions are executed by the processor, implement any of the methods in any above embodiments.

According to an aspect of an embodiment of the present disclosure, a computer program product or computer program is provided, the computer program product or computer program including computer instructions stored in a computer-readable storage medium. The processor of the computer device reads the computer instructions from the computer-readable storage medium, and the processor executes the computer instructions, so that the computer device performs the methods in any of the above embodiments.

It should be noted that, although several modules or units of devices executing the actions are mentioned in the above detailed description, this division is not mandatory. In fact, according to the embodiments of the present disclosure, the features and functions of two or more modules or units described above may be embodied in one module or unit. Conversely, the features and functions of one module or unit described above may be further divided into being embodied by multiple modules or units.

Through the above description of the embodiments, those skilled in the art can easily understand that the example embodiments described here can be implemented by software, or can be implemented by software combined with necessary hardware. Therefore, the technical solution according to the embodiment of the present disclosure can be embodied in the form of a software product, which can be stored in a non-volatile storage medium (which can be a CD-ROM, U disk, removable hard disk, etc.) or on the network, including several instructions to cause a computing device (which can be a personal computer, server, touch terminal, or network device, etc.) to execute the methods according to the embodiments of the present disclosure.

Other embodiments of the present disclosure will be readily apparent to those skilled in the art from consideration of the specification and practice of the embodiments disclosed herein. This disclosure is intended to cover any variations, uses, or adaptations of this disclosure that follow the general principles of this disclosure and include common knowledge or customary technical means in the technical field that are not disclosed in this disclosure.

It is to be understood that the present disclosure is not limited to the specific structures described above and illustrated in the accompanying drawings, and that various modifications and changes may be made without departing from the scope thereof. The scope of the present disclosure is limited only by the appended claims.

What is claimed is:

1. A method for controlling light-emitting devices and applicable to a terminal device, the method comprising:
   receiving broadcast signals broadcasted by at least one light-emitting device, wherein a broadcast signal is used to indicate a first lighting switching instruction message based on which the light-emitting device switches a lighting state; the first lighting switching instruction message is determined based on a device identifier of the light-emitting device; the light-emitting device is equipped with a network module; and the light-emitting device broadcasts the broadcast signal through the network module;
   obtaining a lighting video collected during lighting state switching of the light-emitting device according to the first lighting switching instruction message;
   performing lighting state identification based on the lighting video, and determining a second lighting switching instruction message for switching the lighting state of each light-emitting device in the lighting video;
   matching the first lighting switching instruction message indicated by the broadcast signal with the second lighting switching instruction message corresponding to each light-emitting device in the lighting video to determine a broadcast signal corresponding to each light-emitting device in the lighting video;
   determining a network address of each light-emitting device in the lighting video based on the determined broadcast signal corresponding to each light-emitting device in the lighting video; and
   according to the network address of each light-emitting device in the lighting video, controlling a corresponding light-emitting device.

2. The method according to claim 1, wherein the matching the first lighting switching instruction message indicated by the broadcast signal with the second lighting switching instruction message corresponding to each light-emitting device in the lighting video to determine a broadcast signal corresponding to each light-emitting device in the lighting video further includes:
   matching the second lighting switching instruction message of each light-emitting device in the lighting video with the first lighting switching indicated by each broadcast signal to determine the first lighting switching instruction message that matches the second lighting switching instruction message; and
   determining the broadcast signal corresponding to the first lighting switching instruction message that matches the second lighting switching instruction message as the broadcast signal of the light-emitting device corresponding to the second lighting switching instruction message.

3. The method according to claim 1, wherein the performing lighting state identification based on the lighting video, and determining a second lighting switching instruction message for switching the lighting state of each light-emitting device in the lighting video further includes:
    extracting video frames from the lighting video to obtain a video frame sequence, the video frame sequence including at least two frames of video;
    performing lighting state identification on each of at least two video frames to determine a lighting state of each light-emitting device in each video frame; and
    combining the lighting states belonging to a same light-emitting device in each video frame according to an order of the video frames in the video frame sequence to obtain the second lighting switching instruction message corresponding to the lighting state switching of each light-emitting device in the lighting video.

4. The method according to claim 3, wherein the extracting video frames from the lighting video to obtain a video frame sequence further includes:
    extracting the video frames from the lighting video according to a preset frame rate to obtain the video frame sequence, wherein the preset frame rate is determined based on a time interval at which the light-emitting device switches the lighting state.

5. The method according to claim 3, wherein the perform lighting state identification on each of at least two video frames to determine a lighting state of each light-emitting device in each video frame further includes:
    performing target detection on each video frame of at least two video frames to determine a target pixel area where each light-emitting device is located in each video frame;
    performing color feature extraction on the target pixel area to obtain a color feature of the target pixel area; and
    identifying the lighting state of the light-emitting device corresponding to the target pixel area according to the color feature of the target pixel area.

6. The method according to claim 5, wherein:
    the color feature includes an HSV feature;
    the lighting state includes lighting color;
    the performing color feature extraction on the target pixel area to obtain a color feature of the target pixel area further includes:
        transforming the target pixel area into an HSV color space to obtain the HSV feature of the target pixel area; and
    the identifying the lighting state of the light-emitting device corresponding to the target pixel area according to the color feature of the target pixel area further includes:
        performing color classification according to the HSV feature of the target pixel area through a color classifier to obtain a color classification result, the color classification result being used to indicate the lighting color of the light-emitting device indicated by the target pixel area.

7. The method of claim 5, further comprising:
    based on position information of the target pixel area of each video frame in the video frame, determining image position of the light-emitting device as indicated by the target pixel area; and
    arranging display position of each light-emitting device in a display interface according to the image position of the light-emitting device indicated by the target pixel area.

8. The method of claim 7, wherein, according to the network address of each light-emitting device in the lighting video, controlling a corresponding light-emitting device further includes:
    determining a trigger area according to a trigger operation triggered in the display interface, the trigger area being an area triggered by the trigger operation;
    determining the target light-emitting device selected for the trigger operation based on the trigger area and the display position of each light-emitting device in the display interface in the lighting video;
    obtaining the network address of the target light-emitting device according to the network address of each light-emitting device in the lighting video; and
    sending a control instruction to the target light-emitting device according to the network address of the target light-emitting device, such that the target light-emitting device changes the lighting state according to the control instruction.

9. The method according to claim 1, wherein, before receiving the broadcast signals broadcasted by the at least one light-emitting device, the method further includes:
    issuing a positioning instruction, such that the light-emitting device that receives the positioning instruction switches the lighting state according to its own first lighting switching instruction message according to the positioning instruction, and broadcasts a broadcast signal; and
    according to the positioning instruction, starting to collect the lighting video to collect the lighting video during lighting state switching of the at least one light-emitting device.

10. The method of claim 1, wherein the network module is a Bluetooth module; and the device identifier is a MAC address of the Bluetooth module in the light-emitting device.

11. An electronic device, comprising:
    a memory for storing computer-readable instructions; and
    at least one processor coupled to the memory and, when executing the computer-readable instructions, configured to perform:
        receiving broadcast signals broadcasted by at least one light-emitting device, wherein a broadcast signal is used to indicate a first lighting switching instruction message based on which the light-emitting device switches a lighting state; the first lighting switching instruction message is determined based on a device identifier of the light-emitting device; the light-emitting device is equipped with a network module; and the light-emitting device broadcasts the broadcast signal through the network module;
        obtaining a lighting video collected during lighting state switching of the light-emitting device according to the first lighting switching instruction message;
        performing lighting state identification based on the lighting video, and determining a second lighting switching instruction message for switching the lighting state of each light-emitting device in the lighting video;
        matching the first lighting switching instruction message indicated by the broadcast signal with the second lighting switching instruction message corresponding to each light-emitting device in the lighting video to determine a broadcast signal corresponding to each light-emitting device in the lighting video;

determining a network address of each light-emitting device in the lighting video based on the determined broadcast signal corresponding to each light-emitting device in the lighting video; and according to the network address of each light-emitting device in the lighting video, controlling a corresponding light-emitting device.

12. The electronic device according to claim 11, wherein the matching the first lighting switching instruction message indicated by the broadcast signal with the second lighting switching instruction message corresponding to each light-emitting device in the lighting video to determine a broadcast signal corresponding to each light-emitting device in the lighting video further includes:

matching the second lighting switching instruction message of each light-emitting device in the lighting video with the first lighting switching indicated by each broadcast signal to determine the first lighting switching instruction message that matches the second lighting switching instruction message; and determining the broadcast signal corresponding to the first lighting switching instruction message that matches the second lighting switching instruction message as the broadcast signal of the light-emitting device corresponding to the second lighting switching instruction message.

13. The electronic device according to claim 11, wherein the performing lighting state identification based on the lighting video, and determining a second lighting switching instruction message for switching the lighting state of each light-emitting device in the lighting video further includes:

extracting video frames from the lighting video to obtain a video frame sequence, the video frame sequence including at least two frames of video;

performing lighting state identification on each of at least two video frames to determine a lighting state of each light-emitting device in each video frame; and combining the lighting states belonging to a same light-emitting device in each video frame according to an order of the video frames in the video frame sequence to obtain the second lighting switching instruction message corresponding to the lighting state switching of each light-emitting device in the lighting video.

14. The electronic device according to claim 13, wherein the extracting video frames from the lighting video to obtain a video frame sequence further includes:

extracting the video frames from the lighting video according to a preset frame rate to obtain the video frame sequence, wherein the preset frame rate is determined based on a time interval at which the light-emitting device switches the lighting state.

15. A non-transitory computer-readable storage medium containing computer-executable instructions for, when executed by one or more processors, performing a light-emitting device control method, the method comprising:

receiving broadcast signals broadcasted by at least one light-emitting device, wherein a broadcast signal is used to indicate a first lighting switching instruction message based on which the light-emitting device switches a lighting state; the first lighting switching instruction message is determined based on a device identifier of the light-emitting device; the light-emitting device is equipped with a network module; and the light-emitting device broadcasts the broadcast signal through the network module;

obtaining a lighting video collected during lighting state switching of the light-emitting device according to the first lighting switching instruction message;

performing lighting state identification based on the lighting video, and determining a second lighting switching instruction message for switching the lighting state of each light-emitting device in the lighting video;

matching the first lighting switching instruction message indicated by the broadcast signal with the second lighting switching instruction message corresponding to each light-emitting device in the lighting video to determine a broadcast signal corresponding to each light-emitting device in the lighting video;

determining a network address of each light-emitting device in the lighting video based on the determined broadcast signal corresponding to each light-emitting device in the lighting video; and according to the network address of each light-emitting device in the lighting video, controlling a corresponding light-emitting device.

16. The non-transitory computer-readable storage medium according to claim 15, wherein the matching the first lighting switching instruction message indicated by the broadcast signal with the second lighting switching instruction message corresponding to each light-emitting device in the lighting video to determine a broadcast signal corresponding to each light-emitting device in the lighting video further includes:

matching the second lighting switching instruction message of each light-emitting device in the lighting video with the first lighting switching indicated by each broadcast signal to determine the first lighting switching instruction message that matches the second lighting switching instruction message; and determining the broadcast signal corresponding to the first lighting switching instruction message that matches the second lighting switching instruction message as the broadcast signal of the light-emitting device corresponding to the second lighting switching instruction message.

17. The non-transitory computer-readable storage medium according to claim 15, wherein the performing lighting state identification based on the lighting video, and determining a second lighting switching instruction message for switching the lighting state of each light-emitting device in the lighting video further includes:

extracting video frames from the lighting video to obtain a video frame sequence, the video frame sequence including at least two frames of video;

performing lighting state identification on each of at least two video frames to determine a lighting state of each light-emitting device in each video frame; and combining the lighting states belonging to a same light-emitting device in each video frame according to an order of the video frames in the video frame sequence to obtain the second lighting switching instruction message corresponding to the lighting state switching of each light-emitting device in the lighting video.

18. The non-transitory computer-readable storage medium according to claim 17, wherein the extracting video frames from the lighting video to obtain a video frame sequence further includes:

extracting the video frames from the lighting video according to a preset frame rate to obtain the video frame sequence, wherein the preset frame rate is determined based on a time interval at which the light-emitting device switches the lighting state.

\* \* \* \* \*